(12) United States Patent
Roth

(10) Patent No.: US 6,505,796 B1
(45) Date of Patent: Jan. 14, 2003

(54) HANGER ASSEMBLY FOR HANGING ELONGATED MEMBERS FROM A SUPPORT

(76) Inventor: Steven A. Roth, P.O. Box 0933, Alamo, CA (US) 94507

( * ) Notice: Subject to any disclaimer, the term of this patent is extended or adjusted under 35 U.S.C. 154(b) by 0 days.

(21) Appl. No.: 09/892,108

(22) Filed: Jun. 26, 2001

(51) Int. Cl.[7] ................................................. E21F 17/02
(52) U.S. Cl. ...................................... 248/62; 248/68.1
(58) Field of Search .............................. 248/62, 60, 58, 248/68.1, 74.1, 74.2, 64, 70, 73

(56) References Cited

U.S. PATENT DOCUMENTS

| | | | | |
|---|---|---|---|---|
| 2,003,159 A | * | 5/1935 | Taylor | 248/62 |
| 2,413,772 A | * | 1/1947 | Morehouse | 24/243 |
| 3,068,924 A | * | 12/1962 | Summers | 151/41.7 |
| 5,082,216 A | | 1/1992 | Roth | 248/62 |
| 5,181,680 A | * | 1/1993 | Coll | 248/61 |

OTHER PUBLICATIONS

Catalog No. 493, Pipe Hangers and Devices, of PHD Manufacturing Inc., Columbiana, Ohio on pp. 31, 35, 37, 40, 43 and 89.

* cited by examiner

Primary Examiner—Leslie A. Braun
Assistant Examiner—A. Joseph Wujciak, III
(74) Attorney, Agent, or Firm—Thomas R. Lampe

(57) ABSTRACT

A hanger assembly for hanging elongated members from a support includes two hangers releasably connected by a connector to the support, one of the hangers being positioned in the interior of the other hanger. The connector includes side walls which cooperate with shoulder elements connected to the hangers to maintain proper positioning of the hangers.

29 Claims, 16 Drawing Sheets

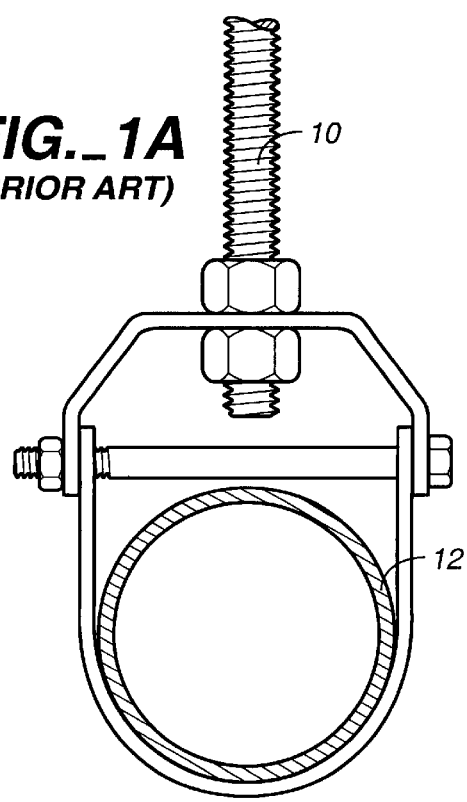
FIG._1A
(PRIOR ART)
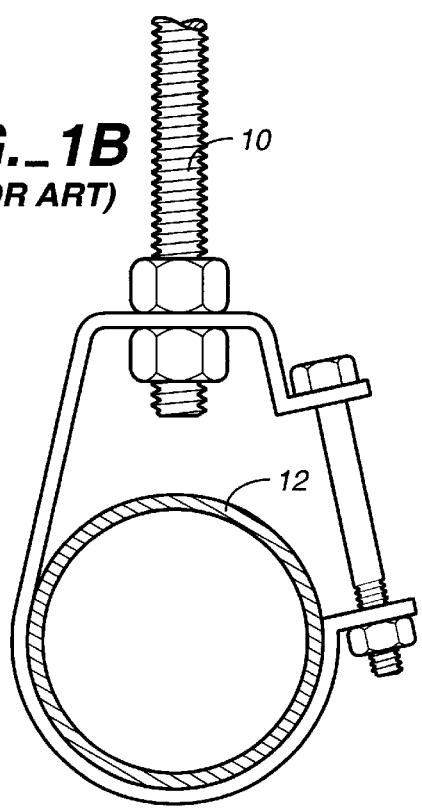
FIG._1B
(PRIOR ART)
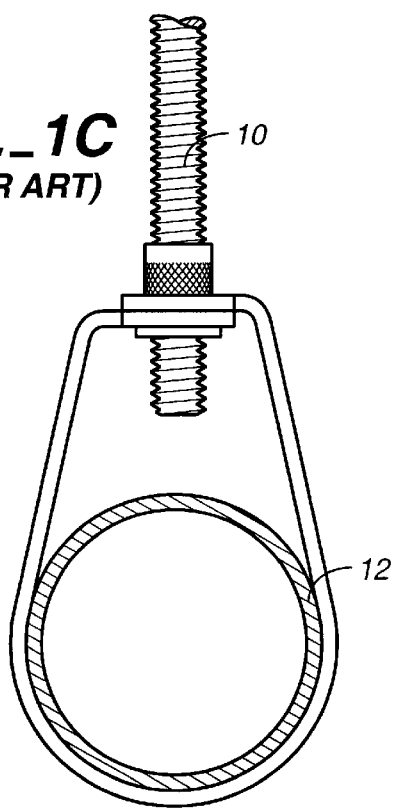
FIG._1C
(PRIOR ART)
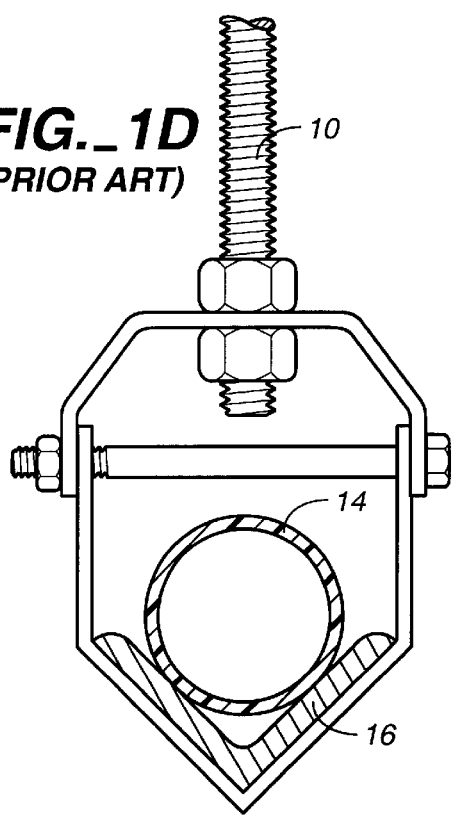
FIG._1D
(PRIOR ART)

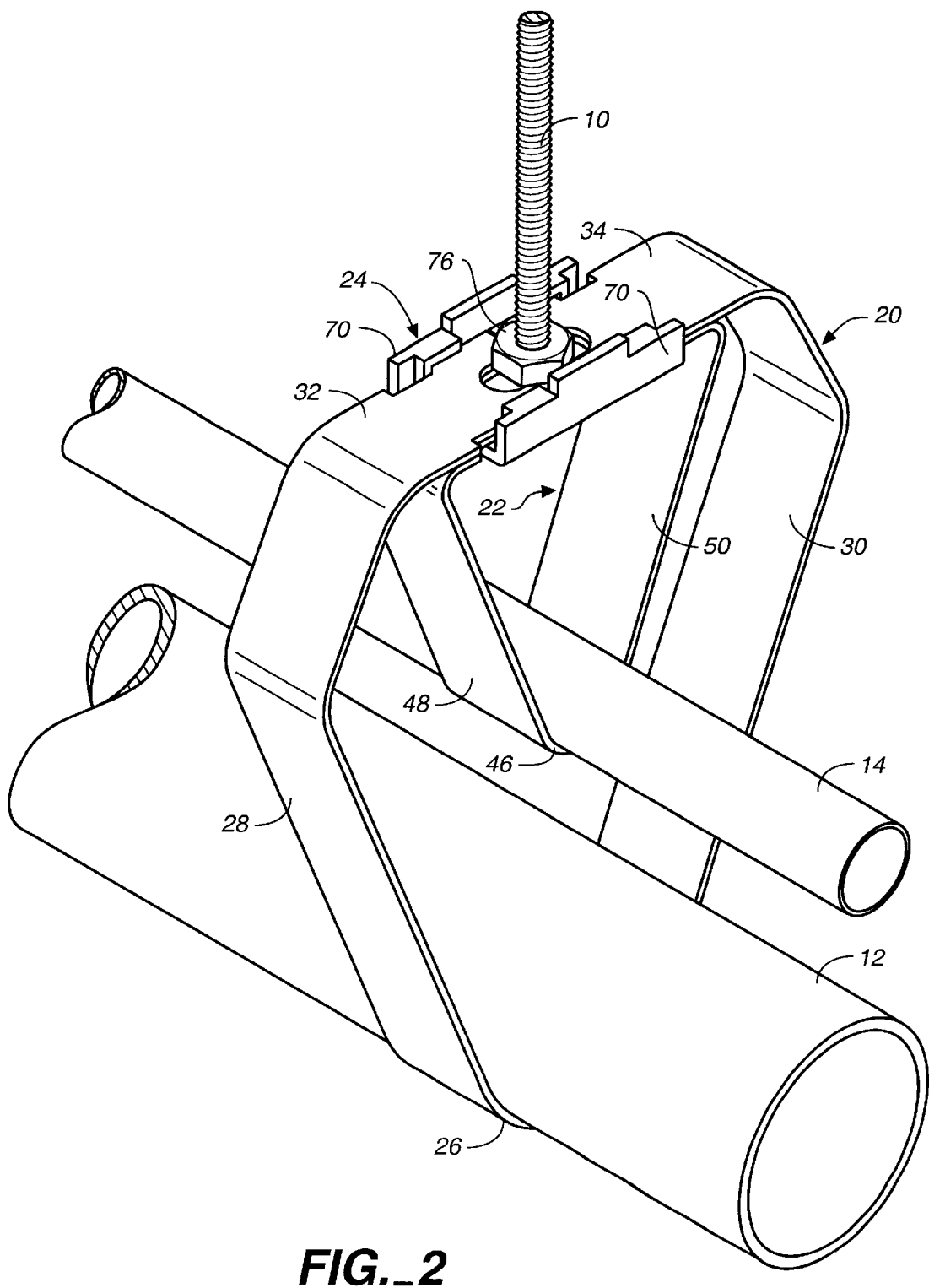
FIG._2

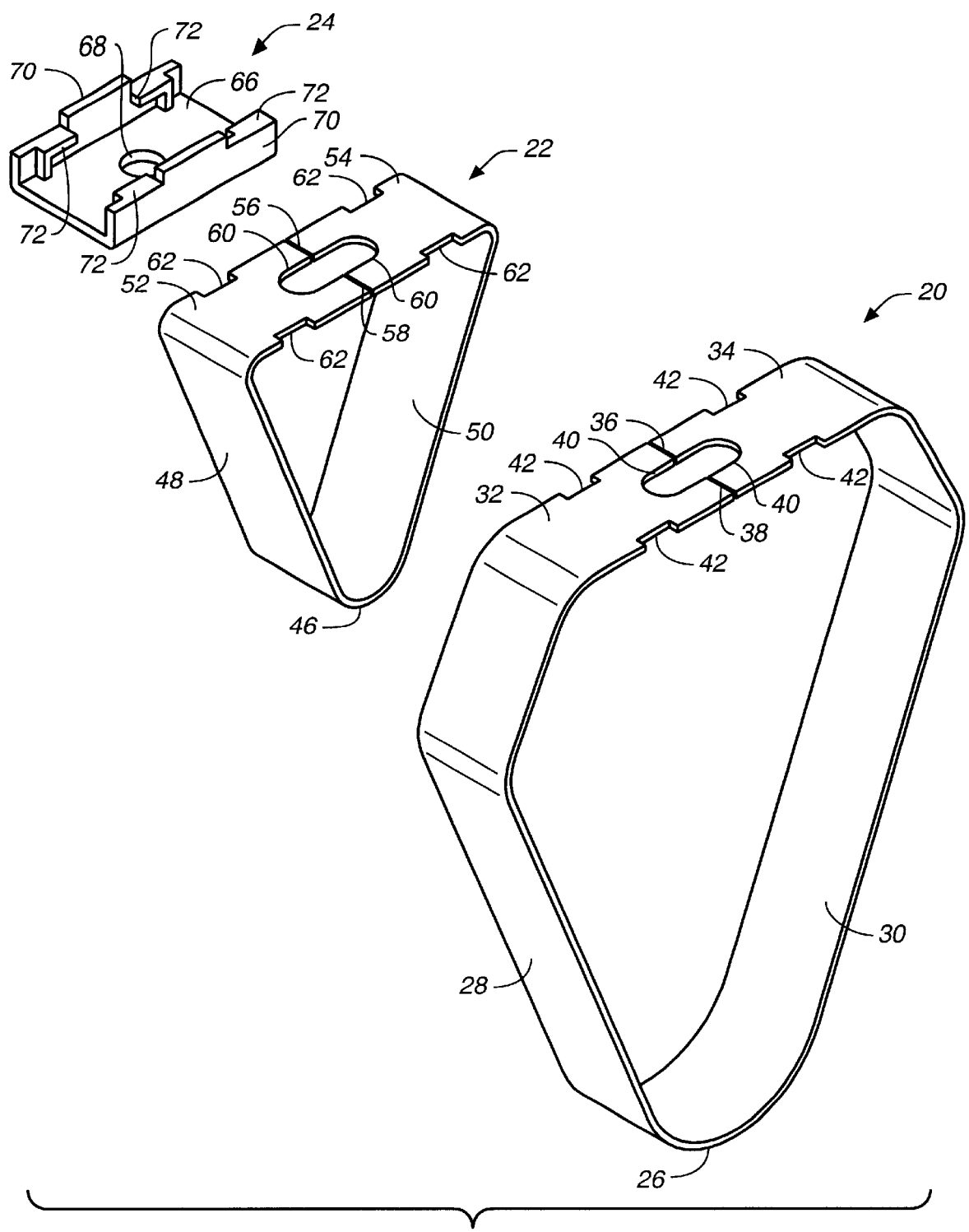
FIG._3

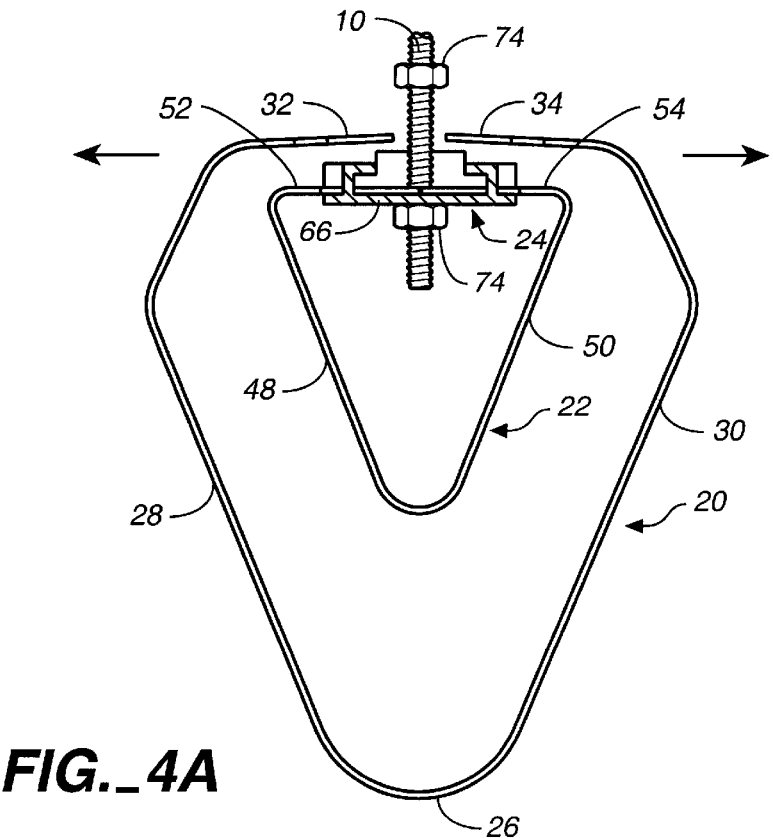
FIG._4A
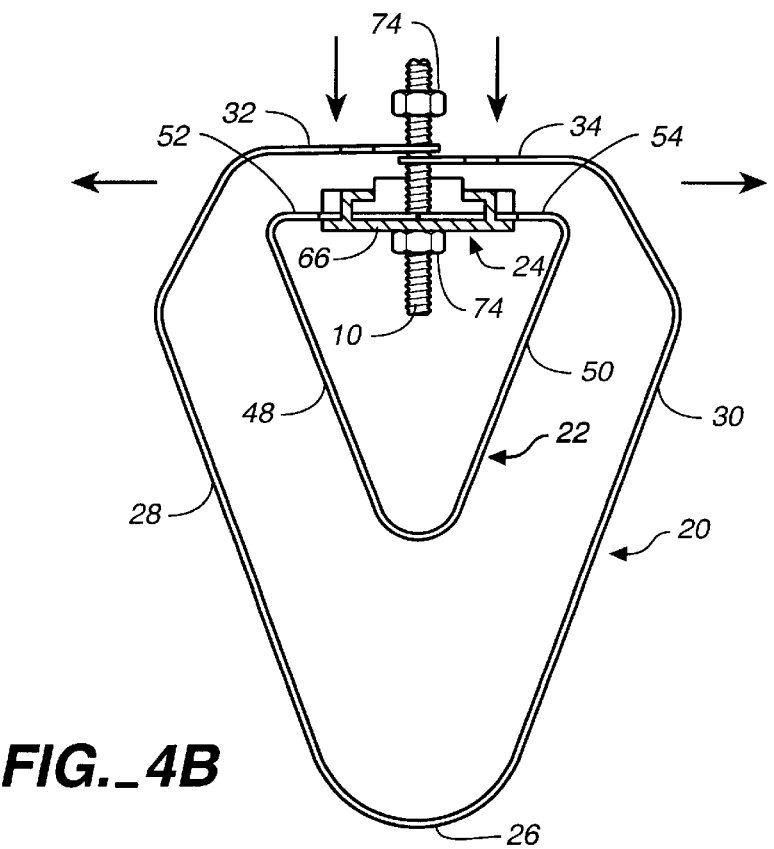
FIG._4B

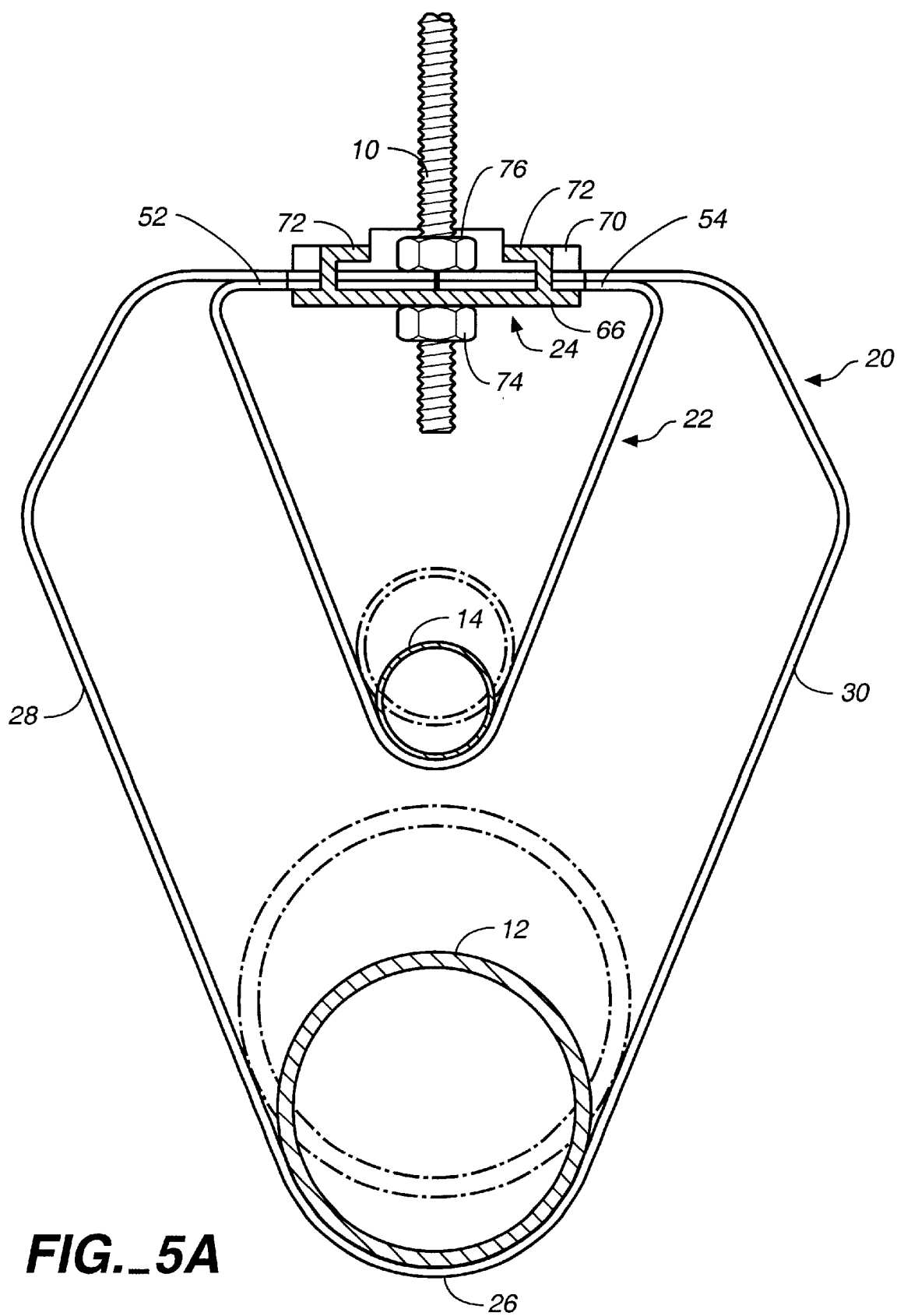
FIG._5A

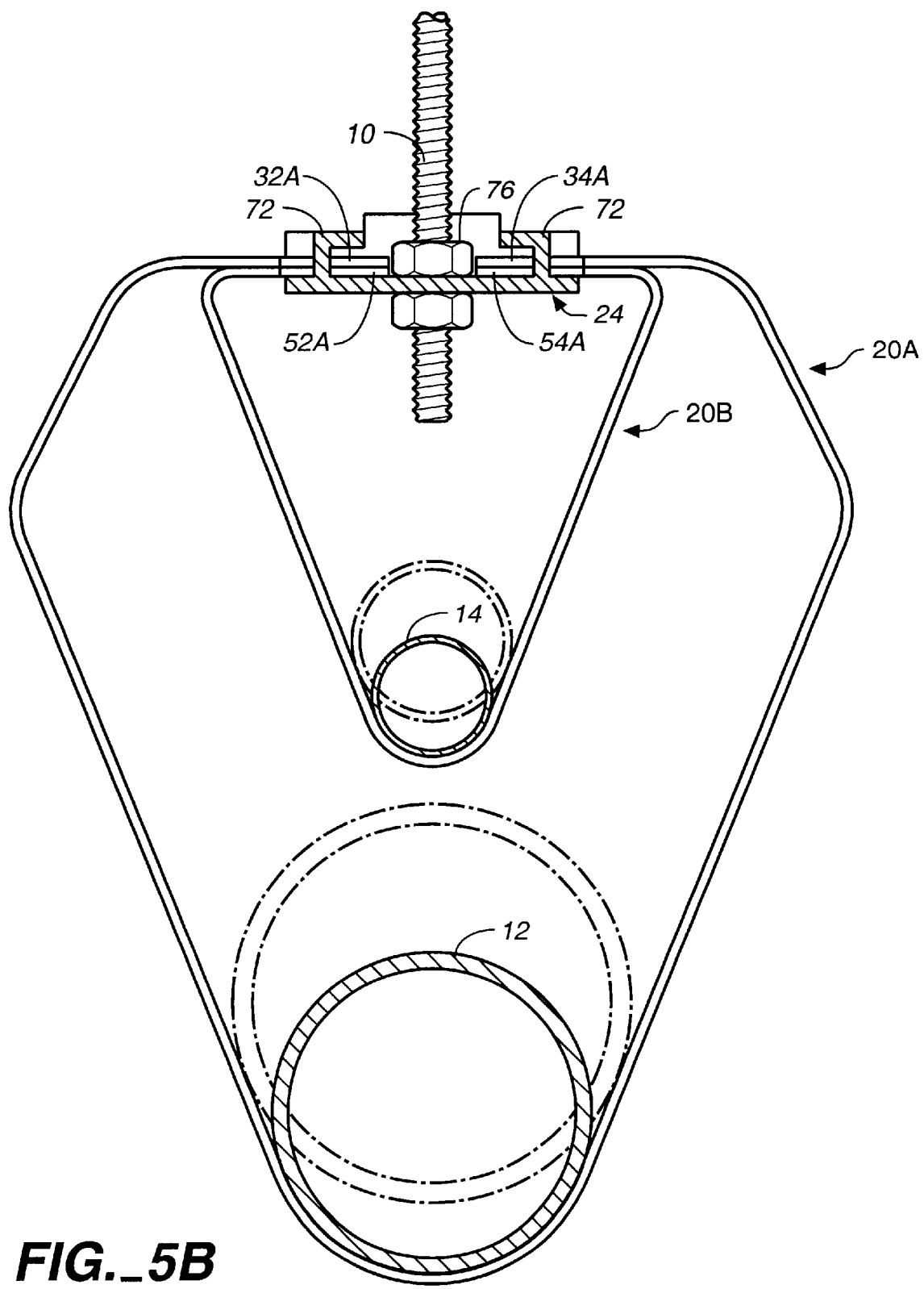
FIG._5B

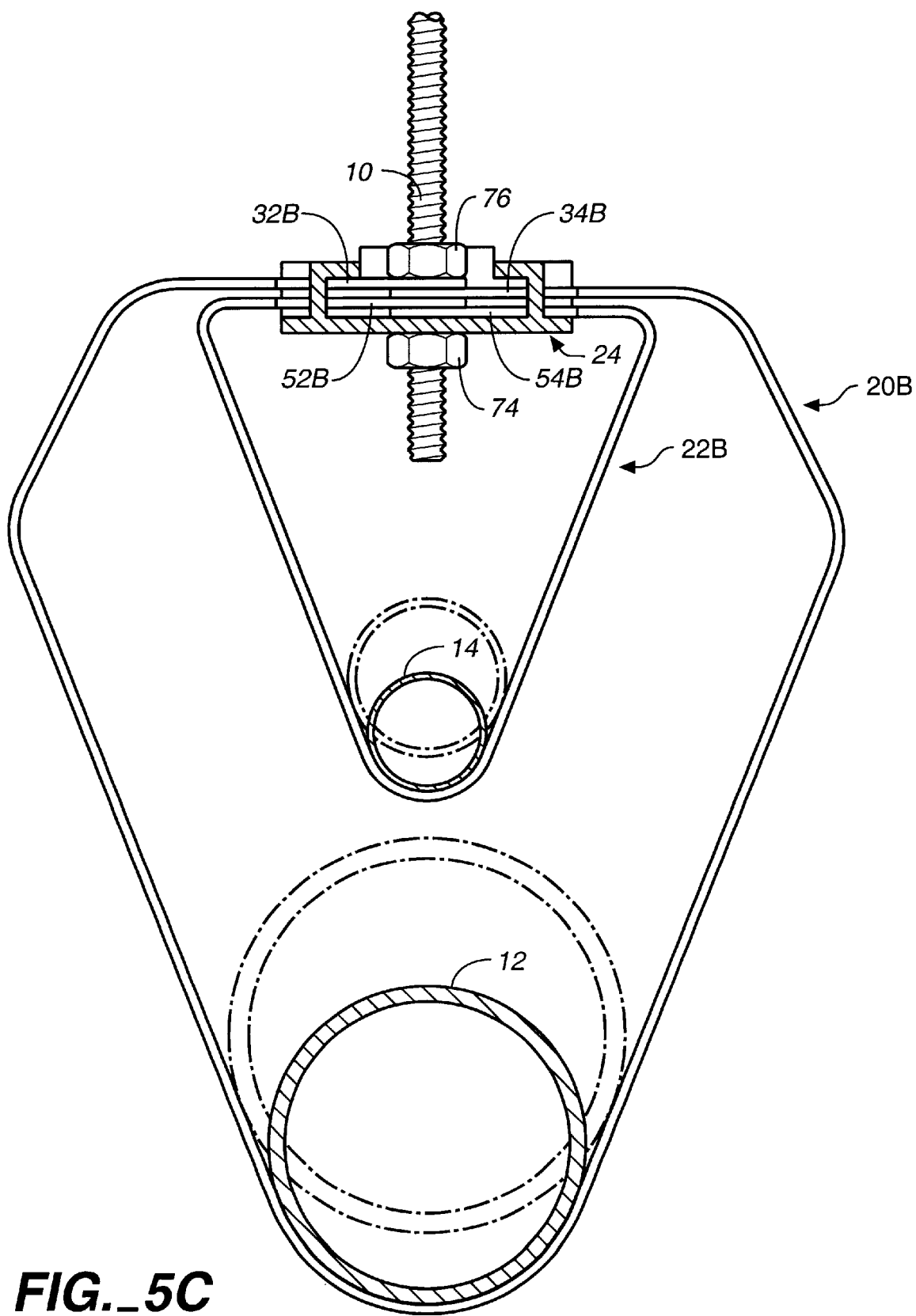
FIG._5C

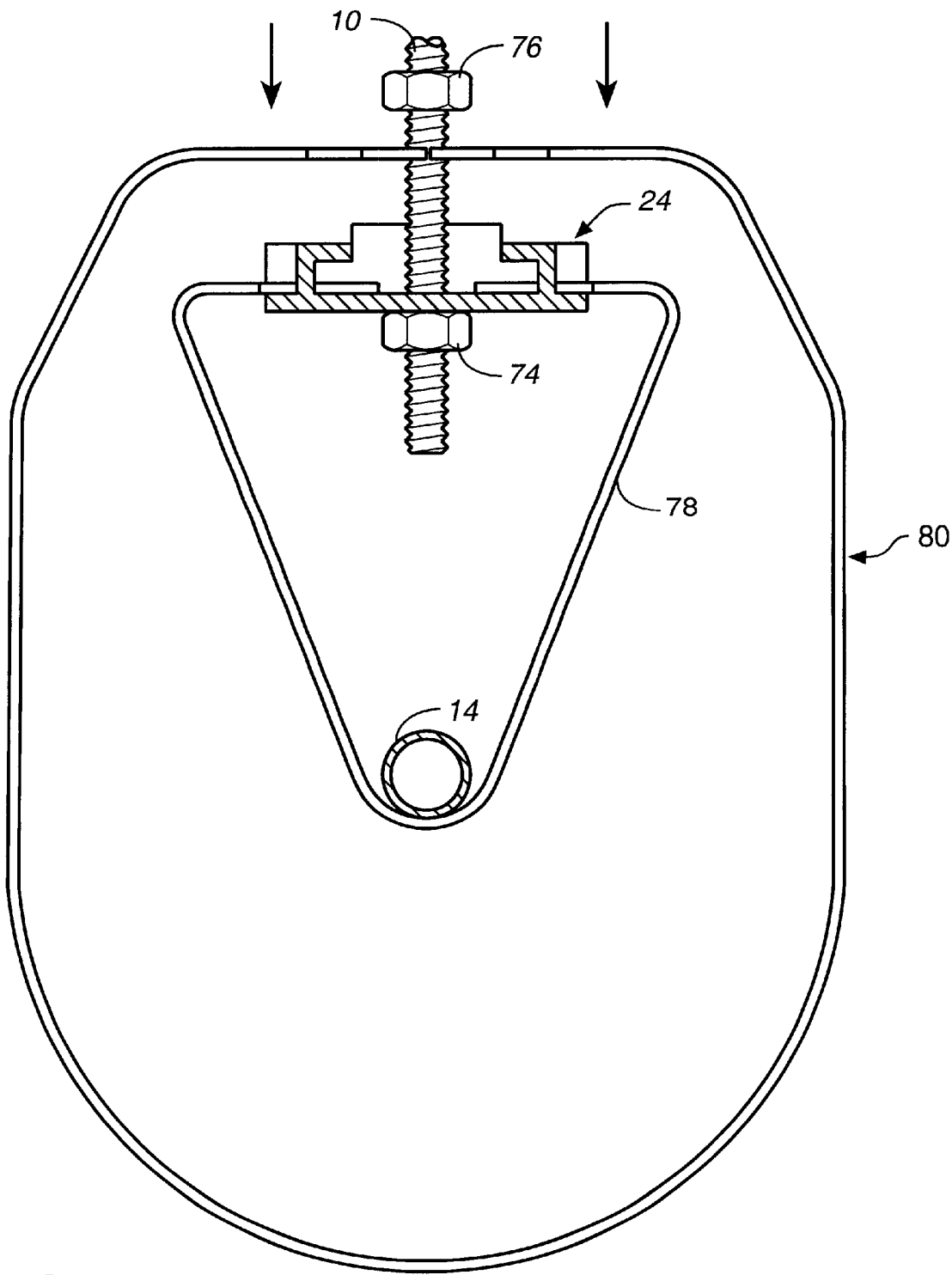
FIG._6A

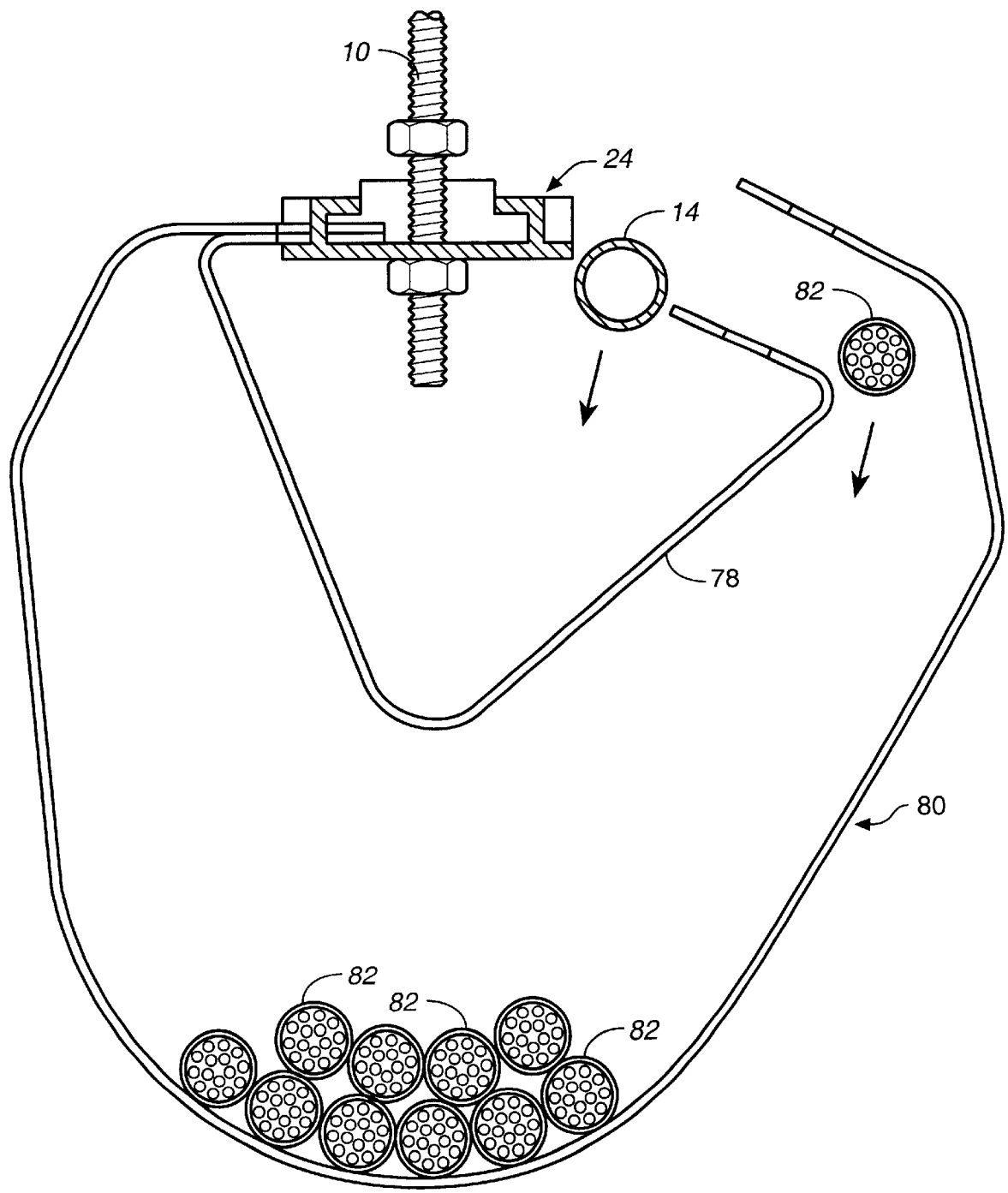
FIG._6B

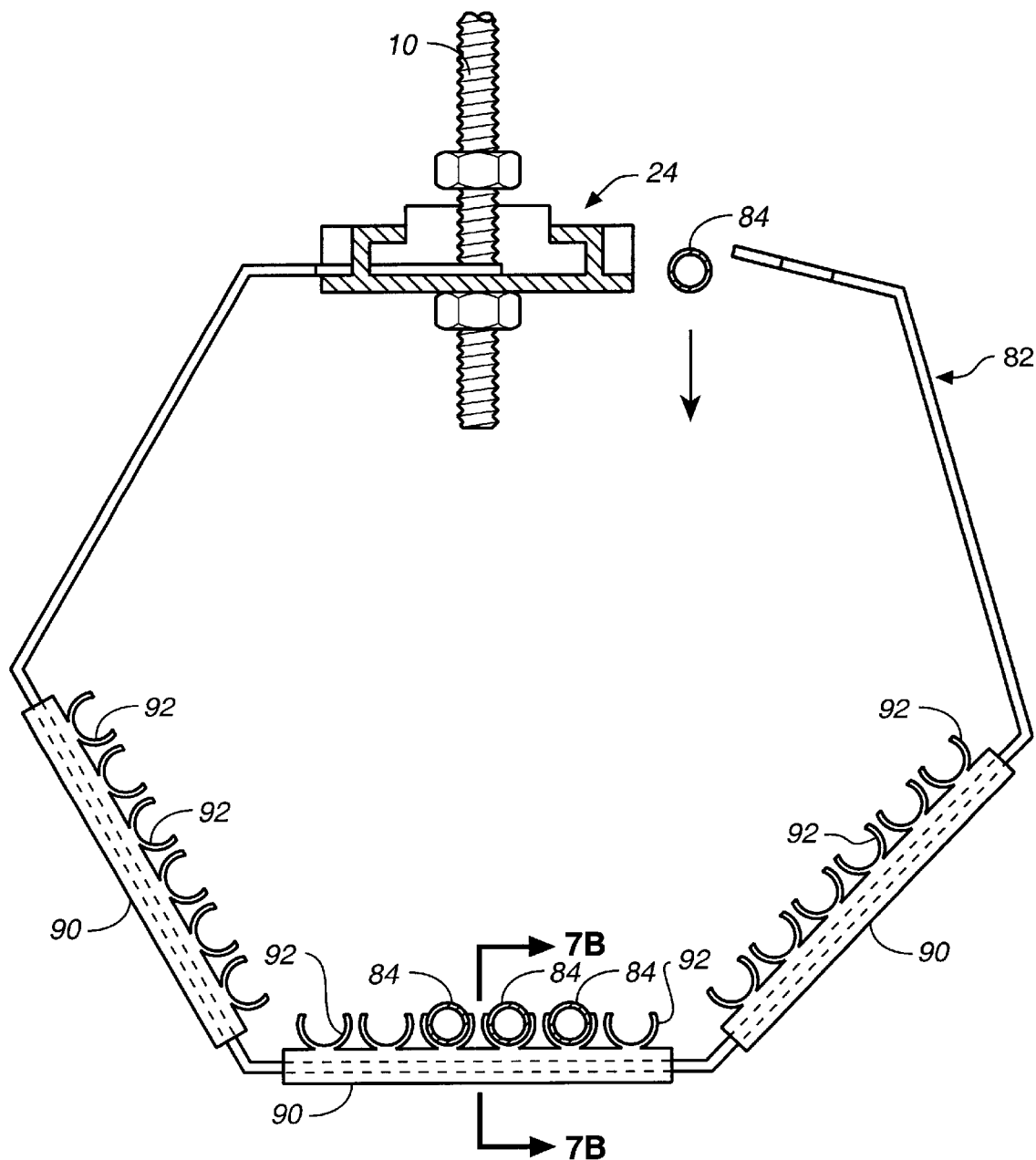
FIG._7A
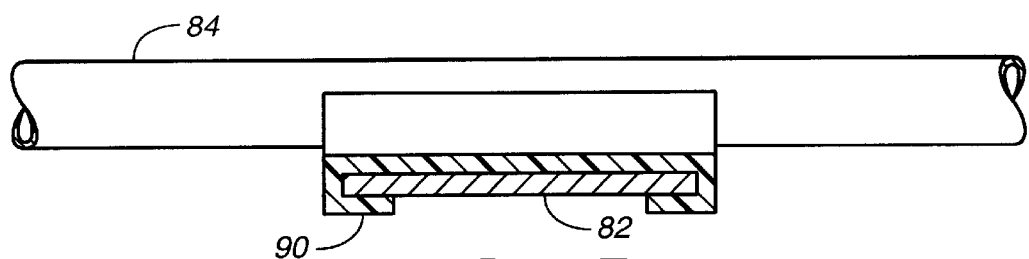
FIG._7B

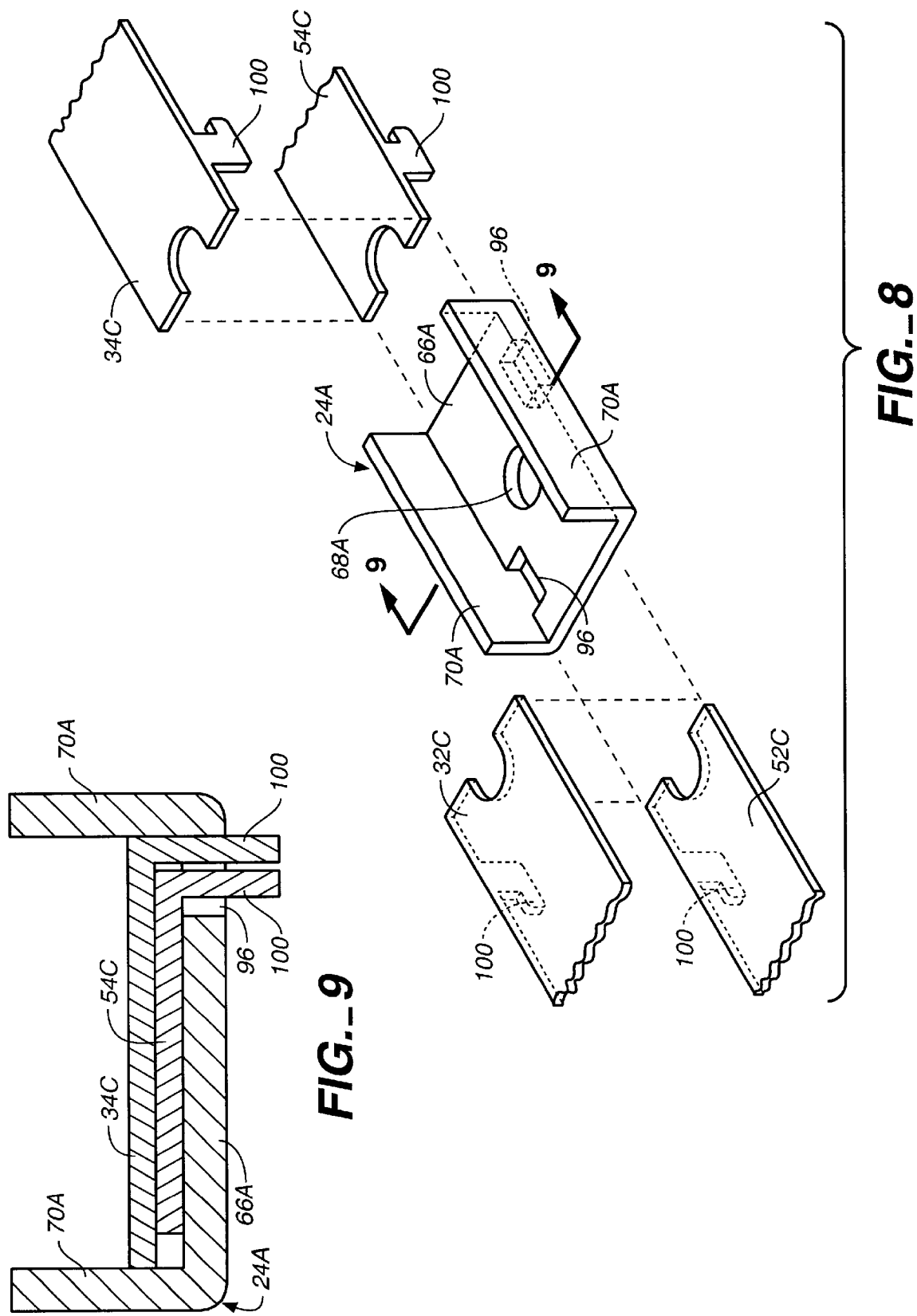

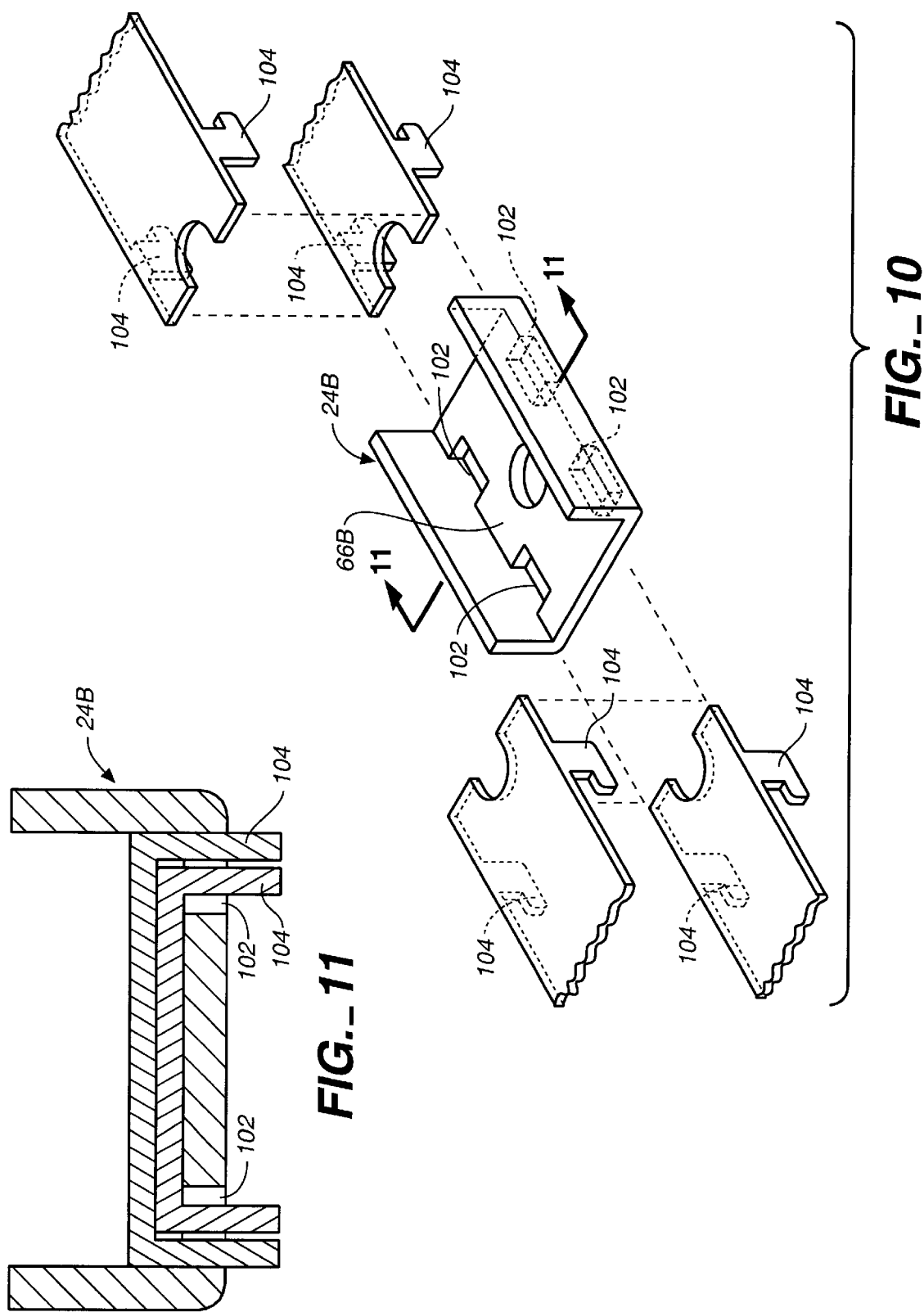

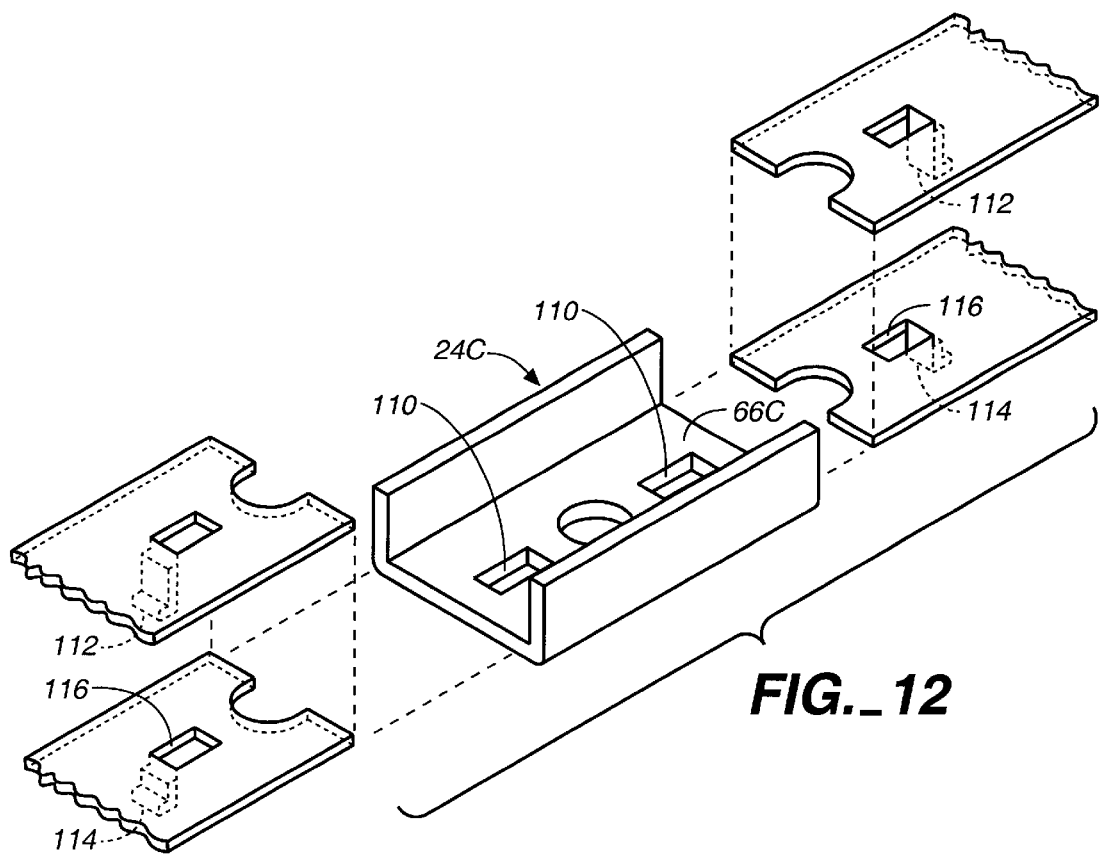
FIG._12
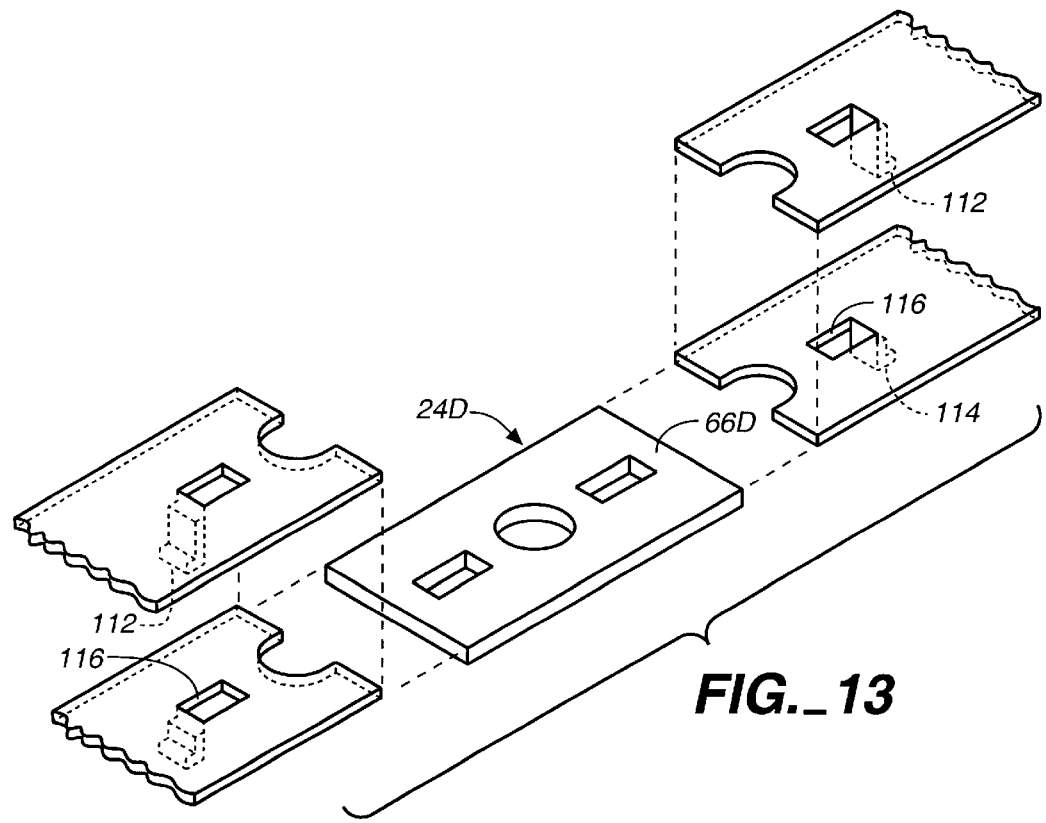
FIG._13

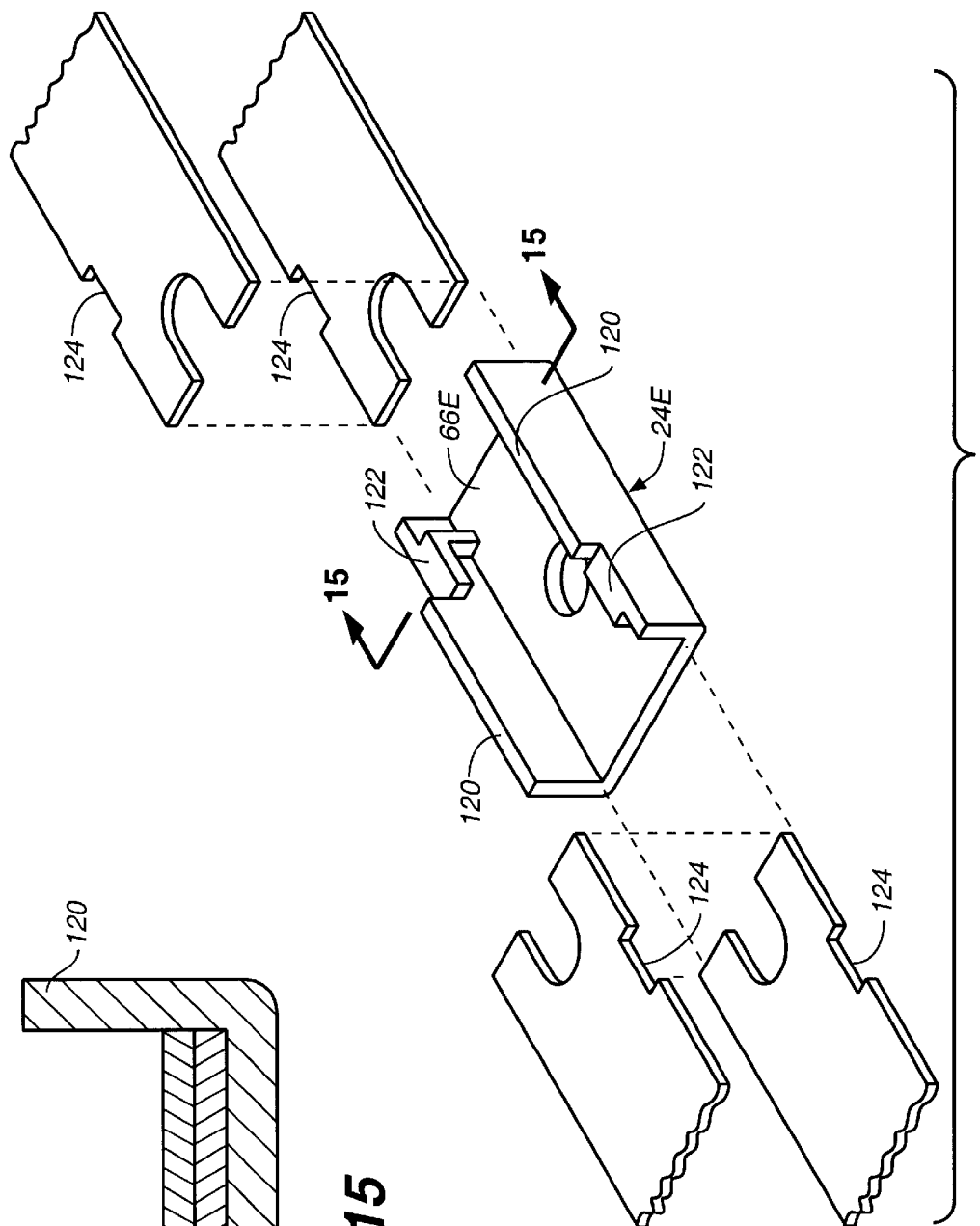
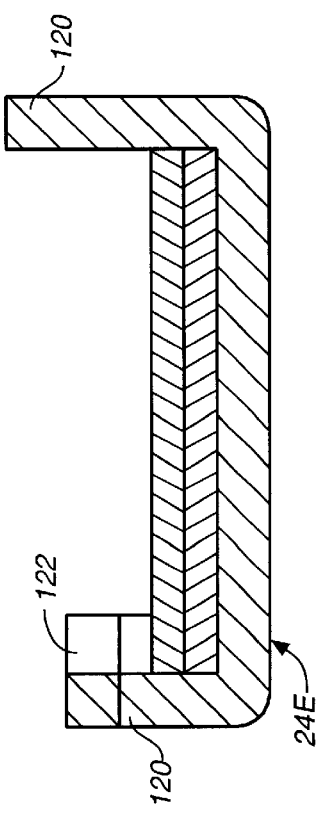

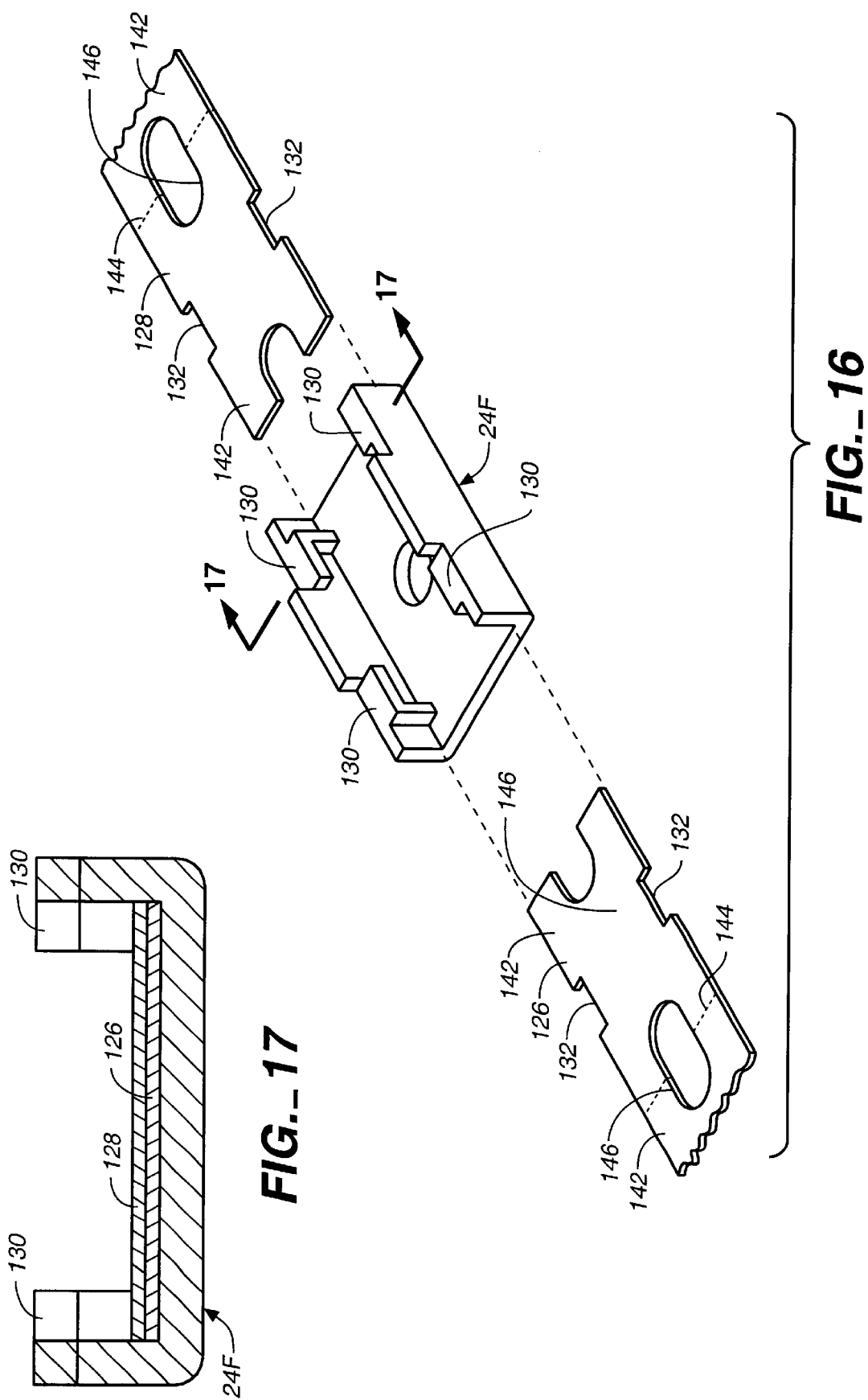

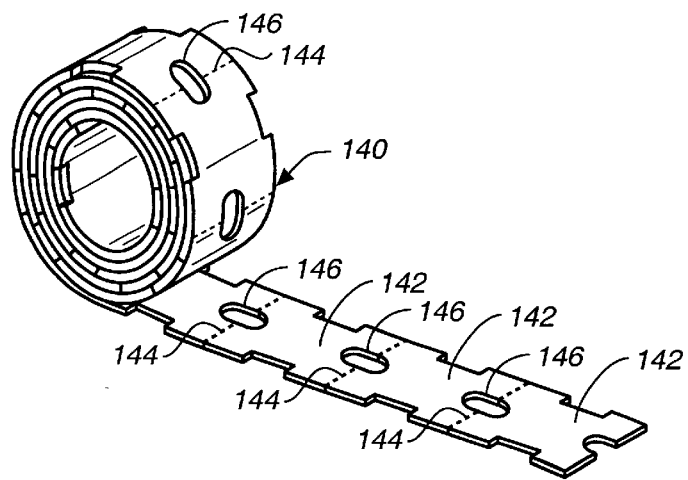
FIG._18
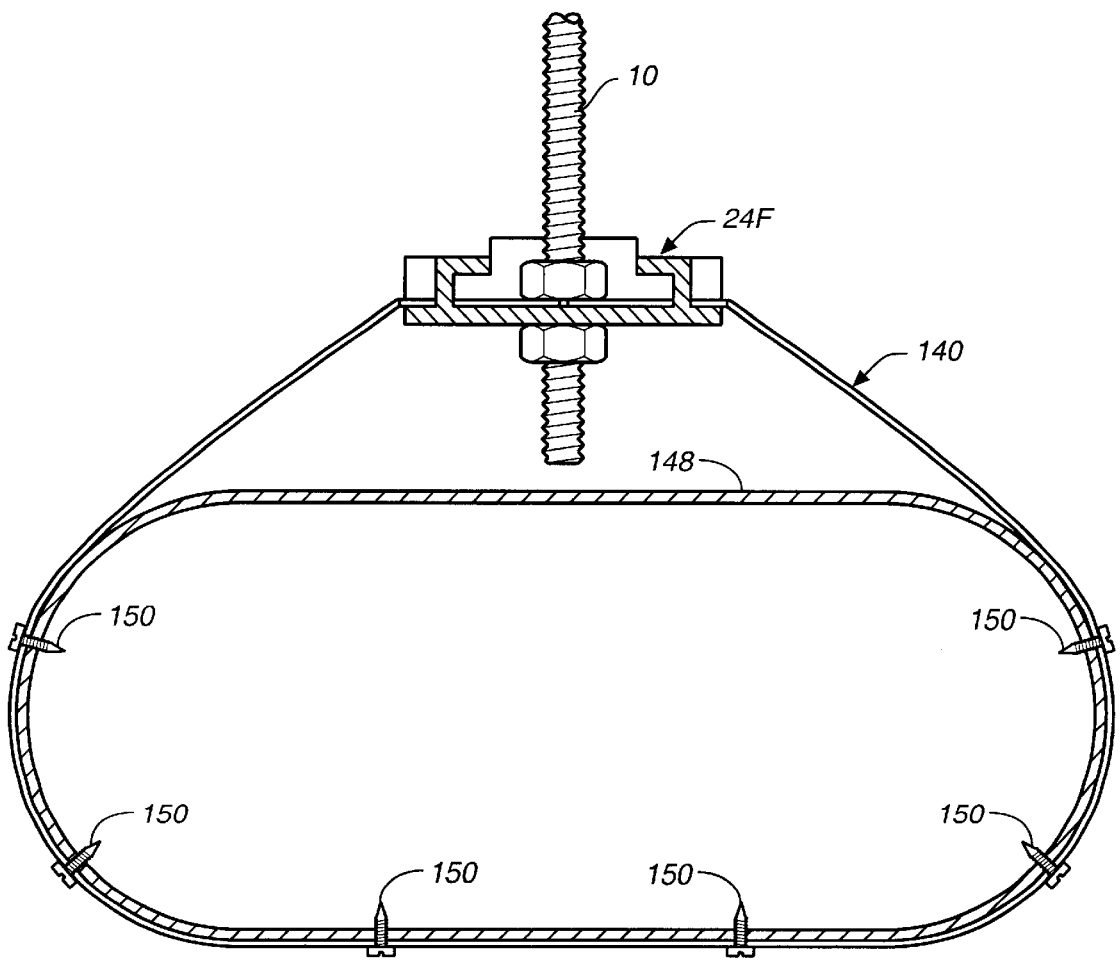
FIG._19

US 6,505,796 B1

HANGER ASSEMBLY FOR HANGING ELONGATED MEMBERS FROM A SUPPORT

TECHNICAL FIELD

This invention relates to a hanger assembly for hanging a plurality of elongated members from a support. The hanger assembly has application, for example, to support lengths of pipe for carrying water, steam or other fluids or electrical conduits from ceilings, beams or other overhead portions of structures.

BACKGROUND OF THE INVENTION

Hangers for pipes and other elongated members typically incorporate a U-shaped metal strip that is attached to a beam or other structural member by a threaded rod that extends through a hole in the upper portion of the hanger. Nuts are employed to hold the hanger on the threaded rod and to adjust hanger elevation.

When conventional hangers are employed to support a length of pipe, for example, all of the hangers are normally placed over the end of the pipe and then each is connected to its threaded support rod one at a time until the length of pipe is properly hung from all the hangers. The task of hanging a length of pipe is cumbersome because the pipe must be held in position while each threaded rod is placed in an aperture passing through the top of each hanger and then both the hanger and the pipe must be held in position while a nut, and usually washer, are installed on the end of the threaded rod. To add to the difficulty, the task of hanging a length of pipe from a number of hangers usually is performed while the installer is standing on a ladder. Conventional types of pipes supports and hangers are shown, for example, in Catalog No. 493, Pipe Hangers and Devices, of PHD Manufacturing, Inc., Columbiana, Ohio on pages 31, 35, 37, 40, 43 and 89.

My U.S. Pat. No. 5,082,216, discloses a pipe hanger assembly that can be installed on a hanger rod using no tools and only one hand. The hanger assembly of the invention disclosed in that patent includes a hanger having a general U-shape and including slotted shoulder portions or elements at the top of the legs of the U-shaped hanger. The shoulder portions are in generally horizontal orientation when the hanger assembly is in use.

The assembly of U.S. Pat. No. 5,082,216 further includes a holding element that is separately installed on the threaded rod before a pipe is hung, the holding element having locking elements that enter the slots in the shoulders of the pipe support, preferably by compressing the natural springiness of the U-shaped hanger to fit the slots over the locking elements, after which release of the U-shaped hanger causes the slots to be biased away from one another and engagement with the locking elements of the holding element.

The hanger assemblies noted above are for the purpose of hanging a single pipe or other elongated member. In addition, the hangers typically narrow as they progress upwardly so that pipes and other types of elongated members cannot be installed with ease. Furthermore, conventional hangers are generally sized specifically for one size of pipe, for example, and employing a hanger with a pipe smaller than that for which it is not designed will result in the pipe rolling or otherwise being unstable in the hanger.

DISCLOSURE OF INVENTION

The hanger assembly disclosed and claimed herein incorporates a number of features which remedy certain deficiencies of the prior art.

The hanger assembly of this invention is for hanging a plurality of pipes or other elongated members from a support.

The hanger assembly includes a first hanger for receiving a first elongated member and includes a first elongated member engagement element and a pair of first hanger legs spaced from one another, extending upwardly from the first elongated member engagement element and having spaced distal ends. The first hanger defines a first hanger interior.

The hanger assembly also includes a second hanger for receiving a second elongated member and including a second elongated member engagement element and a pair of second hanger legs spaced from one another, extending upwardly from the second elongated member attachment element and having spaced distal ends.

A connector is provided for releasably connecting the first hanger and the second hanger together and to the support with the second hanger positioned in the first hanger interior.

The invention also encompasses a hanger assembly including a hanger for receiving an elongated member and including an elongated member engagement element, a pair of hanger legs spaced from one another and extending upwardly from the elongated member engagement element and a pair of shoulder elements attached to the distal ends of the pair of hanger legs.

The shoulder elements project toward one another. Each of the shoulder elements has a shoulder element front edge and defines a support receiving opening extending inwardly from the shoulder element front edge. Each of the shoulder elements has two spaced side edges.

The hanger assembly also includes a connector for releasably connecting the shoulder elements together at the side edges thereof and for connecting the hanger to the support.

Other features, advantages and objects of the present invention will become apparent with reference to the following description and accompanying drawings.

BRIEF DESCRIPTION OF DRAWINGS

FIGS. 1A–1D are side elevational views depicting four different prior art pipe hangers;

FIG. 2 is a perspective view of a preferred embodiment of hanger assembly constructed in accordance with the teachings of the present invention utilized to hang two separate elongated members from a threaded hanger or support rod;

FIG. 3 is an exploded perspective view illustrating two hangers employed in the assembly of FIG. 2 along with a connector for releasably connecting the two hangers together and to the hanger rod;

FIGS. 4A and 4B are elevational views illustrating the hanger assembly of FIG. 2 in the process of being assembled;

FIG. 5A is an enlarged elevational view illustrating the hanger assembly of FIG. 2 in fully assembled condition and supporting two elongated members in the form of pipes, phantom line depictions illustrating that alternative sizes of the elongated members can be accommodated in the hanger assembly;

FIG. 5B a view similar to FIG. 5A, but illustrating a second embodiment of the invention;

FIG. 5 s a view similar to FIGS. 5A and 5B, but illustrating a third embodiment of the invention;

FIG. 6 discloses a fourth embodiment of the invention in the process of being assembled and illustrating the fact that a second hanger can be added to the assembly after one hanger is already in place;

FIG. 6B illustrates the embodiment of FIG. 6A, but shows the hangers partially disassembled from the connector employed in the assembly to allow placement of a plurality of elongated members therein;

FIG. 7A illustrates a fifth embodiment of the invention and depicts the use of holders utilized to hold and maintain in spaced relationship plurality of elongated members;

FIG. 7B is an enlarged, cross-sectional view taken along the line 7B—7B in FIG. 7A;

FIG. 8 is a perspective view of a connector of a sixth embodiment of the invention prior to attachment thereto of shoulder element of two hangers;

FIG. 9 is an enlarged cross-sectional view of the connector of FIG. 8 and also illustrating a cross-section of two shoulder elements connected thereto by detents inserted in an indent formed in the connector;

FIG. 10 s a view similar to FIG. 8, but illustrating a seventh embodiment of the invention;

FIG. 11 is an enlarged cross-sectional view taken along line 11—11 in FIG. 10;

FIG. 12 s a view similar to FIG. 10, but illustrating an eighth embodiment the invention;

FIG. 13 s a view similar to FIG. 12, but showing a ninth embodiment of the invention;

FIG. 14 is a view similar to FIG. 10 showing a tenth embodiment of the hunger assembly;

FIG. 15 is an enlarged, cross-sectional view taken along line 15—15 of FIG. 14;

FIG. 16 is a view similar to FIG. 12 showing an eleventh embodiment of the invention;

FIG. 18 is an enlarged cross-sectional view taken along line 17—17 of FIG. 16;

FIG. 18 is a perspective view of a partially unwound roll of strip material utilized to form a hanger and shoulder elements; and FIG. 1 is a cross-sectional, elevational view illustrating a connector attached to a hanger rod and utilized in association with hanger material of the type shown in FIG. 18 to support a duct.

MODES FOR CARRYING OUT THE INVENTION

FIGS. 1A–1D illustrate several forms of pipe hangers known in the prior art. In each instance, the hanger is attached to a threaded hanger rod 10 by one or more threaded fasteners to support a pipe. In FIGS. 1A–1C, the pipe 12 is larger in cross-section than the pipe 14 supported by the hanger in FIG. 1D. These hanger assemblies are of well known configuration and are shown, for example, in the PHD Manufacturing, Inc. Pipe Hangers and Devices Catalog No. 493 referenced above.

With respect to FIG. 1D, the pipe 14 is supported by a V-shaped channel 16 which in turn is supported by a correspondingly shaped hanger, as shown, and extends between a plurality of similar adjacent hangers (not shown). This particular approach is desirable to provide support between hangers for a pipe or other elongated member which is of a relatively flexible nature. The prior art assemblies shown in FIGS. 1A–1D have the various draw backs or deficiencies discussed above. For example, the hangers are generally devised to receive only one size of pipe and are not appropriate for the support of more than one pipe or other elongated member. Assembly and disassembly of the hangers relative to the associated pipe or other elongated member is relatively complicated and time consuming.

Referring now to FIGS. 2–5A, an embodiment of a hanger assembly constructed in accordance with the teachings of the present invention is illustrated. FIG. 2 and SA illustrate the assembly utilized to support two pipes 12, 14 from a threaded hanger rod 10.

The hanger assembly includes two hangers, hangers 20 and 22, hanger 22 being disposed in the interior of hanger 20. A connector 24 releasably connects the hangers 20, 22 together and to support or hanger rod 10 with hanger 22 positioned in the interior of hanger 20.

Hanger 20 includes an elongated member engagement element 26 located at the bottom of the hanger and a pair of hanger legs 28, 30 which are spaced from one another, extend upwardly from the elongated member engagement element and have spaced distal ends. The hanger 20 has a generally V-shaped configuration, the legs 28, 30 diverging in an upward direction.

A pair of shoulder elements 32, 34 are attached to the distal ends of the hanger legs 28, 30, respectively, the shoulder elements 32, 34 projecting toward one another, as shown. In the arrangement illustrated, the shoulder elements 32, 34 are integral with the hanger legs and also the hanger legs are integral with elongated member engagement element 26, a strip of steel or other suitable material being utilized for such construction.

Shoulder element 32 has a front edge 36 and shoulder element 34 has a front edge 38. The front edges 36, 38 are in abutting condition in the completed hanger assembly. A support receiving opening in the form of a slot 40 extends inwardly from each shoulder element front edge.

Each shoulder element 32, 34 has spaced side edges defining indents or notches 42. In the arrangement shown in FIGS. 2–5A, there are four such indents, two to a shoulder element, with the indents of each shoulder element being in opposition to one another.

Hanger 22 is essentially a reduced size version of hanger 20. Hanger 22 includes an elongated member engagement element 46 and hanger legs 48, 50 divergingly extending upwardly therefrom. A shoulder element 52 extends from hanger leg 48 and a shoulder element 54 extends from hanger leg 50. The front edges 56, 58 of the shoulder elements 52, 54, respectively, abut when the hanger 22 is in the completed hanger assembly. Slots 60 are formed in the shoulder elements 52, 54 and extend inwardly from the front edges thereof. Indents or notches 62 are located at opposed side edges of the shoulder elements 52, 54.

As is the case with hanger 20, hanger 22 has a generally V-shaped configuration, the hanger legs 48, 50 diverging in an upward direction.

As indicated above, connector 24 is another component of the hanger assembly and is utilized to releasably connect the hangers 20, 22 together and to the hanger rod or support 10 with the hanger 22 positioned in the hanger 20 interior. In this manner, space is effectively utilized and a single hanger rod can be utilized to support more than one hanger and more than one pipe or other elongated member.

The connector 24 includes a connector plate 66 defining an aperture 68 which receives the support or hanger rod 10, similar to the central hole in the plate employed in the pipe hanger assembly disclosed in my above referenced U.S. Pat. No. 5,082,216. Connector 24, however, differs from the arrangement shown in U.S. Pat. No. 5,082,216 in that a pair of retainer elements in the form of side walls 70 are affixed to and extend upwardly from the connector plate. Furthermore, detents 72 are provided which project inwardly from the side walls above the connector plate.

The first step in forming the completed hanger assembly is to pass the hanger rod 10 through aperture 68 of the connector plate and move the connector plate to the desired position on the hanger rod. A lower nut 74 is then threaded on the hanger rod to prevent downward movement of the connector. Next, the shoulder elements 52, 54 are pulled apart manually to position the hanger rod in the location of slots 60, the shoulder elements being placed above the connector 24. The front edges 56, 58 of the shoulder elements are then brought into abutting position with the shoulder elements 52, 54 resting on connector plate 66. In the process, detents 72 are received by indents 62 to maintain the front edges 56, 58 abuttingly engaged and the hanger rod 10 captured in the aligned slots 60.

Next, as shown in FIGS. 4A and 4B, the same process is repeated for hanger 20 and shoulder elements 32, 34. When the front edges 36, 38 of shoulder elements 32, 34 are brought into abutting engagement, the detents 72 will be disposed in indents 42 of shoulder elements 32, 34. Shoulder elements 32, 34 rest respectively on shoulder elements 52, 54. Upper nut 76 on the hanger rod 10 is then threaded downwardly into engagement with the shoulder elements 32, 34 to clamp all of the shoulder elements 32, 34, 52, 54 between nut 74 and connector 24.

It will be noted that the side edges of all four shoulder elements are engageable with the side walls 70. This maintains the shoulder elements in alignment and prevents twisting of the hangers.

As noted above, the hangers 20, 22 each have a generally V-shaped configuration, with the interiors wider at the tops than at the bottoms. This provides several advantages. First of all, the configuration allows pipes or other elongated members of different sizes to be held in the hangers in a stable condition. This is shown by the phantom line depiction of different sized elongated members in FIG. 5A. This must be compared to conventional arrangements wherein the hangers are generally U-shaped, allowing smaller pipes, conduits or the like to be displaced in the hanger and not maintained in a stable condition.

The legs 28, 30 provide bearing surfaces which direct the elongated members to a desired central location with respect to the hanger and in alignment with the hanger rod 10. In addition, the V-shaped configuration allows a pipe, for example, to be inserted endwise into the hangers and properly positioned therein, if desired, without having to maintain the elongated member in a horizontal condition and carefully guided into position.

claim 5B shows an alternative embodiment of the invention which is the same as the embodiment of FIG. 2 except that the front edges of all four shoulder elements do not have slots similar to slots 40, 60 extending inwardly from the front edges of the shoulder elements. The front edges of the shoulder elements 32A, 34A are spaced apart and the front edges of the shoulder elements 52A, 54A are spaced apart to define a space therebetween for receiving nut 76. The detents 72 are prevented from leaving the recesses of the shoulder elements due to engagement between the nut 76 and the front edges of the shoulder elements.

FIG. 5C shows an assembly including hangers 20B, 22B having shoulder elements affixed thereto which are not in abutting engagement, but rather overlap between the nut 76 and the connector 24. In other words, the distal ends of the shoulder elements of 32B, 34B, 52B and 54B overlap and are clamped between nuts 76, 74.

FIG. 6A shows an inner hanger 78 having a generally V-shape, as described above, and an outer hanger 80 having a more conventional U-shaped configuration. This figure is for the purpose of illustrating that the principles of the present invention can be employed with other than V-shaped hangers and that the outer hanger can be added at any time after the inner hanger is in position.

If desired, more than two hangers can depend from a single connector 24 and associated hanger rod.

FIG. 6B illustrates disengagement of the shoulder elements associated with the hangers at only one side of the hangers to provide for the ready insertion of a pipe 14 in inner hanger 78 and an electrical conduit 82 into the interior of outer hanger 80 to join a plurality of similar conduits already disposed in the interior thereof.

FIGS. 7A and 7B show a single hanger 82 having five interconnected walls in association with a connector 24. In FIG. 7A one of the shoulder elements associated with hanger 82 has been disengaged from the connector to allow a conduit 84 to be positioned therein or removed therefrom.

Holders 90 are connected to three of the walls of hanger 82, each holder including a plurality of receptacles 92 for receiving individual conduits 84 to maintain them in fixed space relationship. The holders 90 can be attached to the walls of the hanger 82 by any suitable expedient such as by a snap-on connection.

FIGS. 8 and 9 illustrate a connector 24A including a connector plate 66A and side walls 70A extending upwardly therefrom.

In this embodiment of the invention, indents or recesses are defined by the connector plate at the sides thereof and adjoining the side walls 70A. The indents are designated by reference numeral 96. The indents 96 are offset and disposed at opposed sides of the plate 66A.

One recess or indent 96 is formed at each side of the connector plate and the recesses are disposed near opposed ends of the connector plate.

The recesses 96 receive locking detents 100 formed on shoulder elements 32C, 34C associated with one hanger and on shoulder elements 52C, 54C associated with another hanger. Shoulder elements 52C, 54C are narrower than shoulder elements 32C, 34C so that the locking detents 100 of shoulder elements 34C, 54C can be disposed side-by-side and positioned in one recess or indent 96 and the tabs 100 of shoulder elements 32C, 52C can be disposed side-by-side and inserted into the other recess 96. FIG. 9 shows the locking detents 100 associated with the shoulder elements 34C, 54C in position in their associated recess or indent 96.

FIGS. 10 and 11 show another embodiment 24B of the connector. This embodiment is similar to that shown in FIGS. 8 and 9 except that four recesses or indents 102 are defined by the connector plate 66B. In this arrangement, each shoulder element has two locking detents 104 which enter the four indents to releasably connect the hangers together and connect the hangers to the connector.

FIG. 12 shows a connector 24C including a connector plate 66C and two side walls extending upwardly therefrom. In this embodiment of the invention, the connector plate has two tab or detent retention openings 110 formed therein. The openings 110 are centered between the side walls and are disposed on opposed sides of the aperture which receives the hanger rod. The connector 24C cooperates with four shoulder elements having locking tabs or detents 112, 114 projecting downwardly therefrom. The locking tabs 112, which are associated with the upper pair of shoulder elements, are longer than the locking tabs 114 associated with the lower set of shoulder elements. When connection is made, the locking tabs 114 are positioned in tab retention openings 110. Locking tabs 112 are then positioned through openings 116 formed in the lower pair of shoulder elements and through tab retention openings 110 of the connector alongside locking tabs 112.

FIG. 13 illustrates an arrangement similar to that of FIG. 12 except that the connector 24D consists solely of a connector plate 66D, there being no side walls.

FIGS. 14 and 15 illustrate an embodiment of the invention including a connector 24E having a connector plate 66E and side walls 120 extending upwardly therefrom. Detents 122 are located at one end only of each side wall, the two detents 122 being disposed at opposite ends of connector 24E. The detents are received in indents or recesses 124 correspondingly placed in two pairs of shoulder elements.

FIGS. 16 and 17 disclose an embodiment wherein a connector 24F is used in association with two shoulder elements 126, 128. In this arrangement, four detents 130 are incorporated in the connector 24F. These detents are received in indents 132 formed at both side edges of the shoulder elements. When in position, the shoulder elements 126, 128 are stacked and cover essentially the full length of the connector plate of connector 24F.

The shoulder elements are formed along with the hanger with which they are associated from strip material of the type shown in FIG. 18 and identified by reference numeral 140. The strip is divided into selectively severable portions 142 by lines of weakness or severance 144. The combined hanger and shoulder elements can be formed in different sizes by severing the strip of material at the appropriate location along its length.

It should be noted that the lines of severance 144 extend through the mid points of elongated openings 146 located at spaced intervals along the strip of material. In FIG. 16 the openings 146 of the two shoulder elements are in partial registration and disposed over the aperture in the connector plate which receives the hanger rod. Alternatively, the front edges of the outermost strip portions 142 of the shoulder elements could be in abutting engagement and different pairs of detents 130 disposed in the indents 132 of the shoulder elements.

FIG. 19 shows an arrangement wherein the connector 24F is utilized with strip material 140 to support a duct 148 from a threaded hanger rod. Screws 150 secure the hanger segment of the strip material to the duct. The shoulder element segments of the strip material are in abutting engagement on the connector plate of connector 24F and clamped into engagement therewith by nuts on the threaded hanger rod.

The invention claimed is:

1. A hanger assembly for hanging a plurality of pipes or other elongated members from a support, said hanger assembly comprising, in combination:
   a first hanger for receiving a first elongated member and including a first elongated member engagement element and a pair of first hanger legs spaced from one another, extending upwardly from said first elongated member engagement element and having spaced distal ends, said first hanger defining a first hanger interior;
   a second hanger for receiving a second elongated member and including a second elongated member engagement element and a pair of second hanger legs spaced from one another, extending upwardly from said second elongated member attachment element and having spaced distal ends; and
   a connector for releasably connecting said first hanger and said second hanger together and to said support with said second hanger positioned in said first hanger interior, said first hanger additionally including a pair of first shoulder elements attached to the distal ends of said pair of first hanger legs, the first shoulder elements projecting toward one another, and said second hanger additionally including a pair of second shoulder elements attached to the distal ends of said pair of second hanger legs projecting toward one another, said connector for releasable locking engagement with said first and second shoulder elements, each of said first and second shoulder elements having two spaced side edges, at least one of said side edges defining an indent, said connector including a connector plate and detents affixed to said connector plate for positioning in the indents of said first and second shoulder elements to releasably connect together said first and second hangers.

2. The hanger assembly according to claim 1 wherein each of said first and second shoulder elements has a shoulder element front edge and defines a support receiving opening extending inwardly from said shoulder element front edge.

3. The hanger assembly according to claim 2 wherein the shoulder element front edges of said first shoulder elements and the shoulder element front edges of said second shoulder elements are in abutting engagement when said connector releasably connects said first hanger and said second hanger together and to said support.

4. The hanger assembly according to claim 2 wherein said support receiving opening comprises a slot extending inwardly from said shoulder element front edge.

5. The hanger assembly according to claim 1 wherein said connector plate defines an aperture for receiving said support and wherein said connector further includes retainer elements extending upwardly from said connector plate for engaging the side edges of said first and second shoulder elements to restrict movement of said first and second shoulder elements relative to said connector.

6. The hanger assembly according to claim 1 wherein at least some of the first and second shoulder elements are in overlapping relationship when said connector releasably connects said first hanger and second hanger together and to said support.

7. The hanger assembly according to claim 1 wherein the elongated member engagement element and hanger legs of each of said first and second hangers define a generally V-shaped configuration.

8. A hanger assembly for hanging one or more pipes or o ther elongated members from a support, said hanger assembly comprising, in combination:
   a hanger for receiving an elongated member and including an elongated member engagement element, a pair of hanger legs spaced from one another and extending upwardly from the elongated member engagement element and a pair of shoulder elements attached to distal ends of said pair of hanger legs, the shoulder elements projecting toward one another, each of said shoulder elements having a shoulder element front edge and defining a support receiving opening extending inwardly from said shoulder element front edge, and each of said shoulder elements having two spaced side edges; and
   a connector for releasably connecting the shoulder elements together at the side edges thereof and for connecting the hanger to said support, at least one of said side edges defining an indent, said connector including a connector plate and a detent affixed to said connector plate for positioning in said indent.

9. The hanger assembly according to claim 8 wherein said connector includes upwardly extending retainer elements for engaging the side edges of said shoulder elements to restrict movement of said shoulder elements relative to said connector.

10. The hanger assembly according to claim 9 wherein said connector includes a connector plate and wherein said upwardly extending retainer elements comprise spaced side walls affixed to and extending upwardly from said connector plate.

11. The hanger assembly according to claim 8 wherein the shoulder element front edges are in abutting engagement when said connector releasably connects the shoulder elements together and to said support.

12. The hanger assembly according to claim 8 wherein the shoulder elements are in overlapping relationship when said connector releasably connects the shoulder elements together and to said support.

13. The hanger assembly according to claim 8 wherein said elongated member engagement element and hanger legs of said hanger define a generally V-shaped configuration, with said hanger legs diverging in an upward direction.

14. The hanger assembly according to claim 8 wherein said support receiving opening comprises a slot extending inwardly from said shoulder element front edge.

15. The hanger assembly according to claim 8 wherein both of the side edges of each shoulder element define at least one indent, said connector plate having a plurality of detents affixed thereto for positioning in the indents defined by said side edges.

16. A hanger assembly for hanging a plurality of pipes or other elongated members from a support, said hanger assembly comprising, in combination:
a first hanger for receiving a first elongated member and including a first elongated member engagement element and a pair of first hanger legs spaced from one another, extending upwardly from said first elongated member engagement element and having spaced distal ends, said first hanger defining a first hanger interior;
a second hanger for receiving a second elongated member and including a second elongated member engagement element and a pair of second hanger legs spaced from one another, extending upwardly from said second elongated member attachment element and having spaced distal ends; and
a connector for releasably connecting said first hanger and said second hanger together and to said support with said second hanger positioned in said first hanger interior, said first hanger additionally including a pair of first shoulder elements attached to the distal ends of said pair of first hanger legs, the first shoulder elements projecting toward one another, and said second hanger additionally including a pair of second shoulder elements attached to the distal ends of said pair of second hanger legs projecting toward one another, said connector for releasable locking engagement with said first and second shoulder element, each of said first and second shoulder elements having two spaced side edges, at least one of said side edges having a detent projecting therefrom, said connector including a connector plate defining indents for receiving the detents of said first and second shoulder elements to connect together said first and second hangers.

17. The hanger assembly according to claim 16 wherein said connector plate defines an aperture for receiving said support and wherein said connector further includes retainer elements extending upwardly from said connector plate for engaging the side edges of said first and second shoulder elements to restrict movement of said first and second shoulder elements relative to said connector.

18. The hanger assembly according to claim 17 wherein said retainer elements comprise spaced side walls affixed to end extending upwardly from said connector plate.

19. A hanger assembly for hanging a plurality of pipes or other elongated members from support, said hanger assembly comprising, in combination:
a first hanger for receiving a first elongated member and including a first elongated member engagement element and a pair of first hanger legs spaced from one another, extending upwardly from said first elongated member engagement element and having spaced distal ends, said first hanger defining a first hanger interior;
a second hanger for receiving a second elongated member and including a second elongated member engagement element and a pair of second hanger legs spaced from one another, extending upwardly from said second elongated member attachment element and having spaced distal ends; and
a connector for releasably connecting said first hanger and said second hanger together and to said support with said second hanger positioned in said first hanger interior, said first hanger additionally including a pair of first shoulder elements attached to the distal ends of said pair of first hanger legs, the first shoulder elements projecting toward one another, and said second hanger additionally including a pair of second shoulder elements attached to the distal ends of said pair of second hanger legs projecting toward one another, said connector from releasable locking engagement with said first and second shoulder elements, each of said first and second shoulder elements having a shoulder elements front edge, the shoulder element front edges of said first and second shoulder elements defining a space therebetween for receiving a support fastener nut when said connector releasably connects said first hanger and said second hanger together and to said support.

20. A hanger assembly for hanging a plurality of pipes or other elongated members from a support, said hanger assembly comprising, in combination:
a first hanger for receiving a first elongated member and including a first elongated member engagement element and a pair of first hanger legs spaced from one another, extending upwardly from said first elongate member engagement element and having spaced distal ends, said first hanger defining a first hanger interior;
a second hanger for receiving a second elongated member and including a second elongated member engagement element and a pair of second hanger legs spaced from one another, extending upwardly from said second elongated member attachment element and having spaced distal ends; and
a connector for releasably connecting said first hanger and said second hanger together and to said support with said second hanger positioned in said first hanger interior, first hanger additionally including a parir of first shoulder elements attached to the distal ends of said pair of first hanger legs, the first shoulder elements profecting toward one another, and said second hanger additionally including a pair of said pair of shoulder elements attached to the distal ends of said pair of second hanger legs profecting toward one another, said connector for releasable locking engogement with said first and second shoulder elements, said connector including a connector plate having a plurality of tab retention openings formed thereon, each of said first and second shoulder elements having locking tabs projecting downwardly therefrom for insertion into said tab retention openings to releasably connect together said first and second hangers.

21. The hanger assembly according to claim 20 herein said second shoulder elements define openings for receiving locking tabs of said first shoulder elements.

22. A hanger assembly for hanging a plurality of pipes or other elongated members from a support, said hanger assembly comprising, in combination:

a first hanger for receiving a first elongated member and including a first elongated member engagement element and a pair of first hanger legs spaced from one another, extending upwardly from said first elongate member engagement element and having spaced distal ends, said first hanger defining a first hanger interior;

a second hanger for receiving a second elongated member and including a second elongated member engagement element and a pair of second hanger legs spaced from one another, extending upwardly from said first elongated member engagement element and having spaced distal ends, and a connector for releasably connecting said first hanger and said second hanger together and to said support with said second hanger positioned in said first hanger interior, at least one of said first and second hangers being of integral construction and formed from strip material divided into selectively severable hanger portions by lines of severance.

23. A hanger assembly for hanging one or more pipes or other elongated members from a support, said hanger assembly comprising, in combination:

a hanger for receiving an elongated member and including an elongated member engagement element, a pair of hanger legs spaced from one another and extending upwardly from the elongated member engagement element and a pair of shoulder elements attached to distal ends of said pair of hanger legs, the shoulder elements projecting toward one another, each of said shoulder elements having a shoulder element front edge and defining a support receiving opening extending inwardly from said shoulder element front edge, and each of said shoulder elements having two spaced side edges; and a connector for releasably connecting the shoulder elements together at the side thereof and for connecting the hanger to said support, at least one of said shoulder elements including a detent located at a side edge thereof, said connector defining an indent for receiving said detent.

24. The hanger apparatus according to claim 23 wherein at least one detent is located at each side edge of each shoulder element, said connector defining a plurality of indents for receiving the detents located at the side edges.

25. A hanger assembly for hanging one or more pipes or other elongated members from a support, said hanger assembly comprising, in combination:

a hanger for receiving an elongated member and including an elongated member engagement element, a pair of hanger legs spaced from one another and extending upwardly from the elongated member engagement element and a pair of shoulder elements attached to distal ends of said pair of hanger legs, the shoulder elements projecting toward one another, each of said shoulder elements having a shoulder element front edge and defining a support receiving opening extending inwardly from said shoulder element front edge, and each of said shoulder elements having two spaced side edges; and a connector for releasably connecting the shoulder elements together at the side edges thereof and for connecting the hanger to said support, the shoulder element front edges defining a space therebetween for receiving a support fastener nut when said connector releasably connects the shoulder elements together and to said support.

26. A hanger assembly for hanging one or more pipes or other elongated members from a support, said hanger assembly comprising, in combination:

a hanger for receiving an elongated member and including an elongated member engagement element, a pair of hanger legs spaced from one another and extending upwardly from the elongated member engagement element and a pair of shoulder elements attached to distal ends of said pair of hanger legs, the shoulder elements projecting toward one another, each of said shoulder elements having a shoulder element front edge and defining a support receiving opening extending inwardly from said shoulder element front edge, and each of said shoulder elements having two spaced side edges; and a connector for releasably connecting the shoulder elements together at the side edges thereof and for connecting the hanger to said support, said hanger being of integral construction and formed of strip material divided into selectively severable portions by lines of severance.

27. A hanger assembly for hanging one or more pipes or other elongated members from a support, said hanger assembly comprising, in combination:

a hanger for receiving an elongated member and including an elongated member engagement element, a pair of hanger legs spaced from one another and extending upwardly from the elongated member engagement element and a pair of shoulder elements attached to distal ends of said pair of hanger legs, the shoulder elements projecting toward one another, each of said shoulder elements having a shoulder element front edge and defining a support receiving opening extending inwardly from said shoulder element front edge, and each of said shoulder elements having two spaced side edges;

a connector for releasably connecting the shoulder elements together at the side edges thereof and for connecting the hanger to said support; and holders attached to said hanger at said elongated member engagement element for holding individual elongated members.

28. A hanger assembly for hanging a plurality of pipes or other elongated members from a support, said hanger assembly comprising, in combination:

a first hanger for receiving a first elongated member and including a first elongated member engagement element and a pair of first hanger legs spaced from one another, extending upwardly from said first elongated member engagement element and having spaced distal ends, said first hanger defining a first hanger interior;

a second hanger for receiving a second elongated member and including a second elongated member engagement element and a pair of second hanger legs spaced from one another, extending upwardly from said second elongated member attachment element and having spaced distal ends; and a connector for releasably connecting said first hanger and said second hanger together and to said support with said second hanger positioned in said first hanger interior, said first hanger additionally including a pair of first shoulder elements attached to the distal ends of said pair of first hanger legs, the first shoulder elements projecting toward one another, and said second hanger additionally including a pair of second shoulder elements attached to the distal ends of said pair of second hanger legs projecting toward one another, said connector for releasable locking engagement with said first and second shoulder elements, each of said first and second shoulder elements having two spaced side edges, said connector including a connector plate and indents and detents on said connector plate and said shoulder elements cooperable to releasably connect together said first and second hangers.

29. A hanger assembly for hanging one or more pipes or other elongated members from a support, said hanger assembly comprising, in combination:

a hanger for receiving an elongated member and including an elongated member engagement element, a pair of hanger legs spaced from one another and extending upwardly from the elongated member engagement element and a pair of shoulder elements attached to distal ends of said pair of hanger legs, the shoulder elements projecting toward one another, each of said shoulder elements having a shoulder element front edge and defining a support receiving opening extending inwardly from said shoulder element front edge, and each of said shoulder elements having two spaced side edges; and a connector for releasably connecting the shoulder elements together at the side edges thereof and for connecting the hanger to said support, said connector including a connector plate and indents and detents on said connector plate and said shoulder elements cooperable to releasably connect said shoulder elements to said connector plate.

* * * * *